Oct. 11, 1966  R. MATTHEY  3,278,245
SHOCK-ABSORBING BEARING FOR TIME-PIECES OR SMALL MECHANISMS
Filed April 7, 1964

INVENTOR.
ROGER MATTHEY
BY *Kenwood Ross*
ATTORNEY

United States Patent Office 3,278,245
Patented Oct. 11, 1966

1

3,278,245
SHOCK-ABSORBING BEARING FOR TIME-PIECES
OR SMALL MECHANISMS
Roger Matthey, Le Sentier, Vaud, Switzerland, assignor to Parechoc S.A., Le Sentier, Canton of Vaud, Switzerland, a firm of Switzerland
Filed Apr. 7, 1964, Ser. No. 357,920
Claims priority, application Switzerland, Apr. 8, 1963, 4,449/63
1 Claim. (Cl. 308—158)

The present invention relates to a shock-absorbing bearing for time-pieces or other small mechanisms.

This bearing is characterised by the fact that it comprises a bearing element and an end element assembled together so as to form a whole, constituting the bearing body, movable in a bearing support, and an annular spring surrounding the said bearing body and provided with several arms outwardly directed and hooked, by their free extremity, to the said bearing support, these arms being capable of being bent in different directions for absorbing the axial as well as the radial shocks to which the shaft is subjected.

The drawing shows, by way of example, one embodiment of the object of the invention.

Figure 1:
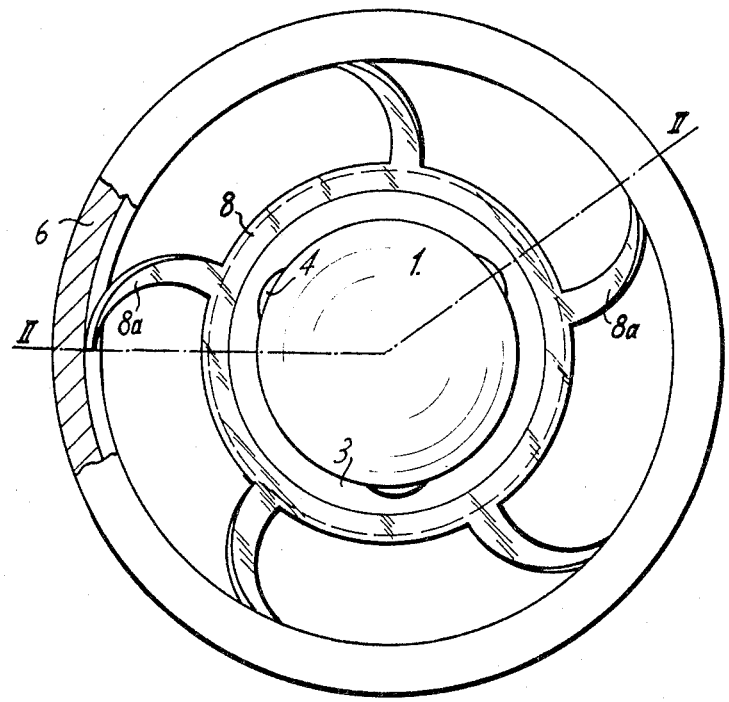
FIG. 1 is a plan view of a shock-absorbing bearing.
Figure 2:
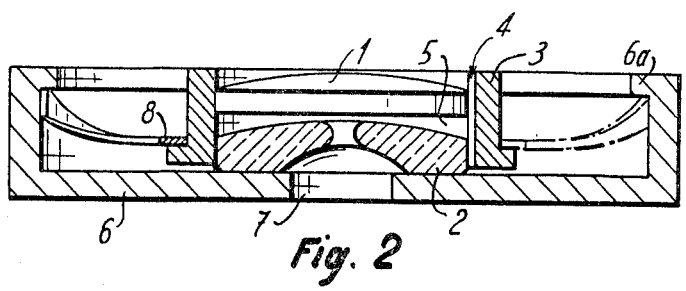
FIG. 2 is a sectional view along line II—II of FIG. 1.

The bearing represented comprises a central body constituted by a cap jewel 1 and by a pierced jewel 2, both being forced in a common setting 3. This setting is provided with three longitudinal grooves 4 which connect the outside with the space 5 located between the two jewels and allow the evacuation of the air enclosed in this space, when the bearing is oiled.

The bearing body is movably mounted inside a fixed support 6 pierced with a central hole 7 for the passage of the shaft, not shown. Its centering in the support 6 is ensured by an annular spring 8 forced into the setting 3. This annular spring is provided with arms 8a extending outwardly and hooked, by their free extremities, under an inner shoulder 6a shown by the bearing support 6. These arms 8a, of rectangular cross-section, are skew, so that the great axis of their section, at the root of these arms, is perpendicular to the axis of the bearing, and that the great axis of their section, at the end of these arms, is parallel to the axis of the bearing. As a result, the arms 8a are able to be bent according to two perpendicular preferential directions, the one parallel to the axis of the bearing and the other perpendicular to this axis; thus the arms 8a of the spring 8 are able to absorb as well the axial as the radial shocks to which the shaft is submitted.

The present bearing constitutes a particularly simple and cheap solution of the problem of the absorption of the shocks submitted to the shafts of time-pieces or small mechanisms. Since the centering of the bearing body is ensured by the spring itself, the working of centering surfaces is suppressed, that reduces substantially the manufacturing cost of the bearing. Moreover, the spring can be obtained by a simple stamping and blanking, that means to a very low cost. Once forced on the setting of the bearing body, this spring has no more to be separated therefrom; the low manufacturing cost of the bearing body and of the spring permits to provide that the whole be replaced when damaged, even if only one or the other of the two elements is damaged. It is to be noted that the cost of the pierced jewel and of a cap jewel is lower than the cost of a cup bearing, generally used in the bearings of the small mechanisms. The difference of the cost will be so high that the cost of the two jewels can still be reduced while using a flat pierced jewel and while placing the convex surface of the cap jewel opposite the pierced jewel, so as to constitute the oil sink.

At last, it is to be noted that the height of the present bearing is less than the height of the conventional bearings in which the spring bears on the outer face of the cap jewel.

What I claim is:

In a shock-absorbing bearing for a shaft of a time piece or other small mechanism comprising, a bearing element, an end element, said bearing and end elements being assembled as a bearing body, a bearing support in which the bearing body is movably mounted, an annular spring surrounding the bearing body and provided with a plurality of outwardly-directed arms, the arms of said spring being hooked by their free extremities to said bearing support, the arms being of a rectangular cross section with the great axis of the cross section at the root of the arms being perpendicular to the axis of the bearing and with the great axis of the section at the free extremities of the arms being parallel to the axis of the bearing, the arms being bendable in two different directions for absorbing axial and radial slacks to the shaft.

References Cited by the Examiner
FOREIGN PATENTS
183,386   6/1936   Switzerland.

DAVID J. WILLIAMOWSKY, Primary Examiner.
FRANK SUSKO, Examiner.